Oct. 13, 1970
C. C. DAY
3,534,282
SPIKE SUPPRESSION CIRCUIT
Filed Aug. 13, 1969
2 Sheets-Sheet 1
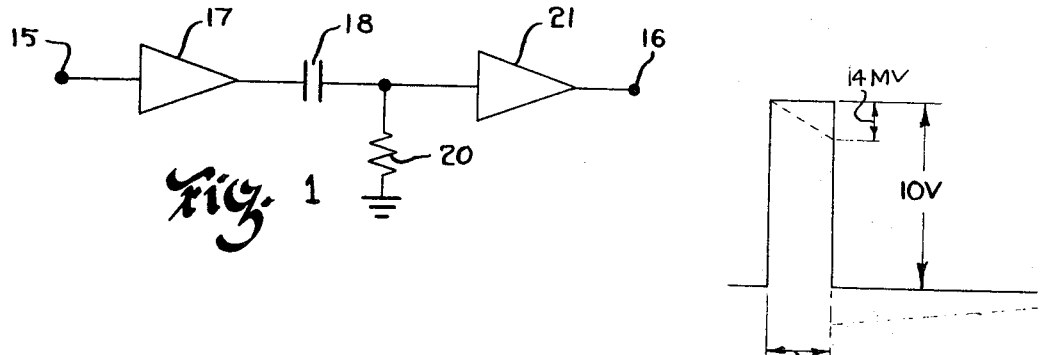
Fig. 1
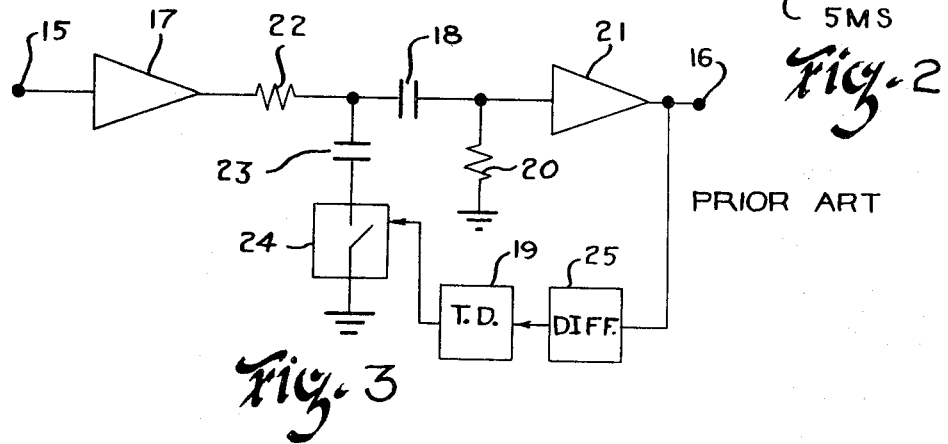
Fig. 3
PRIOR ART
Fig. 2
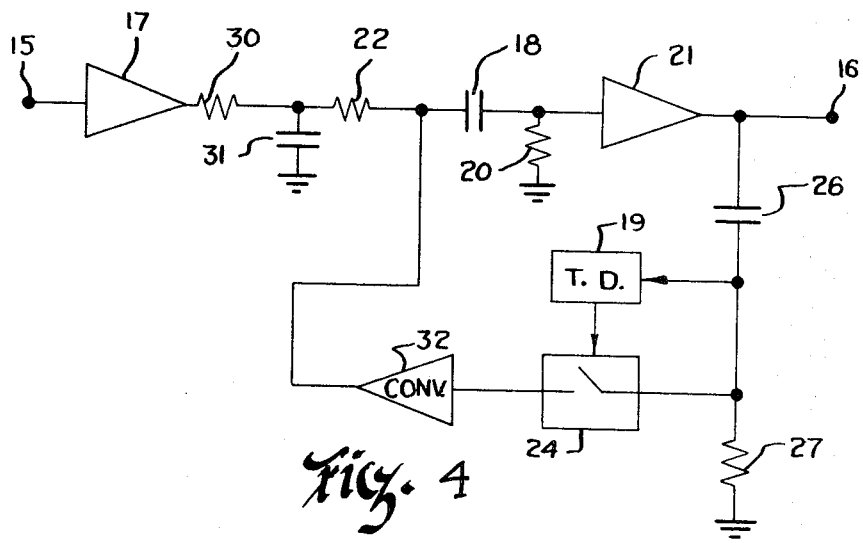
Fig. 4
INVENTOR.
CHRISTOPHER C. DAY
BY Amster & Rothstein
ATTORNEYS Oct. 13, 1970 C. C. DAY 3,534,282
SPIKE SUPPRESSION CIRCUIT
Filed Aug. 13, 1969 2 Sheets-Sheet 2

INVENTOR.
CHRISTOPHER C. DAY
BY
Amster & Rothstein
ATTORNEYS

United States Patent Office 3,534,282
Patented Oct. 13, 1970

3,534,282
SPIKE SUPPRESSION CIRCUIT
Christopher C. Day, Newtonville, Mass., assignor to American Optical Corporation, Southbridge, Mass., a corporation of Delaware
Filed Aug. 13, 1969, Ser. No. 849,624
Int. Cl. H03f 1/26
U.S. Cl. 330—149
7 Claims

ABSTRACT OF THE DISCLOSURE

A spike suppression circuit for an A.C.-coupled electrocardiographic amplifier. The initial rise of a spike at the output of the amplifier above a predetermined value results in the operation of a voltage-to-current converter in a feedback loop. A current, proportional to the differentiated output voltage, is introduced ahead of the capacitive coupling to suppress further excursion of the output due to the spike. Without this circuit the spike would charge the coupling capacitor, in turn driving the displayed waveform off the presentation area; the recovery from this undesirable condition would take many seconds. With the circuit, the capacitor does not charge sufficiently for the displayed waveform to be lost.

---

This invention relates to spike suppression circuits, and more particularly to an electrocardiographic amplifier which is capable of amplifying small signals in the presence of large pulses.

There are many situations in which it is necessary to amplify a small signal in the presence of large pulses. Typical of these situations is that in which an electrocardiographic (ECG) signal is amplified for the purpose of displaying it on an oscilloscope, a paper trace, etc. It is often found that large pulses or spikes appear in the overall ECG signal. For example, a patient being monitored might be equipped with an implanted pacemaker, and the pacemaker stimulating pulses would appear in the ECG signal prior to each QRS waveform.

Typically, these spikes have an amplitude much greater than the amplitude of an ECG waveform. It is apparent that if the gain of the monitoring equipment is adjusted to provide a near full-scale display for the ECG signal, each spike will result in an off-scale output. This, in itself, is of little concern. The problem of most concern is that each spike may affect the amplifier in a way such that the ECG signal following the spike for several seconds may also be off scale.

It is a general object of my invention to provide an amplifier which is capable of amplifying small signals even in the presence of large pulses whose amplitudes may be far greater than the amplitude of the signal.

Briefly, in accordance with the principles of my invention, I provide feedback between the output and input of an amplifying stage in the overall system. The output is differentiated in order to detect the presence of a large pulse. If the differentiated signal exceeds a threshold value, the differentiated signal is applied to the input of a voltage-to-current converter, the output current of this device being proportional to the differentiated output voltage of the amplifying stage (provided it is above the threshold value). The current is fed back to the input of the amplifying stage. The overall transfer function of the stage with this feedback is such that a large pulse at the input does not significantly charge any capacitors in the system which could cause output signals during the next few seconds to be off scale.

It is a feature of my invention to provide a feedback loop to prevent excessive charging of coupling capacitors in an amplifier by large pulses, the feedback loop including a differentiator, a threshold detector, and a voltage-to-current converter.

Further objects, features and advantages of my invention will become apparent upon a consideration of the following detailed description in conjunction with the drawing, in which:

FIG. 1 depicts a typical ECG amplifier and will be helpful in understanding the basic problem with which the invention is concerned;

FIG. 2 depicts two voltage waveforms which characterize the operation of the circuit of FIG. 1;

FIG. 3 is a prior art circuit which has been proposed for minimizing the effect of large input spikes;

FIG. 4 is a block-diagram schematic of a system designed in accordance with the principles of my invention;

Figure 5:
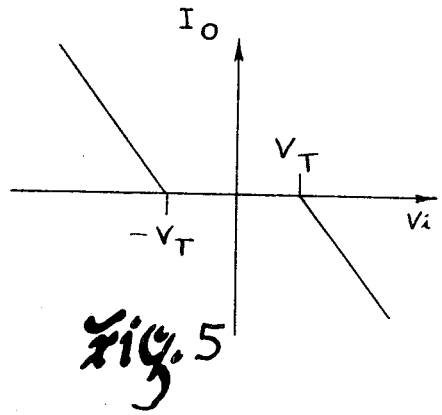
FIG. 5 depicts the operating characteristic of elements 19, 24 and 32 in FIG. 4.

FIG. 1 depicts, primarily in block-diagram form, a typical ECG amplifier. Input terminal 15 is coupled to an electrode attached to the patient. Output terminal 16 is coupled to the display unit. The amplifier includes two amplification stages 17, 21. Each of these stages is generally a D.C. amplifier because the ECG signal contains low frequencies which are of interest (typically, the bandpass of the overall amplifier is .05–50 Hz.). However, A.C. coupling is provided between the two stages rather than D.C. coupling. The purpose of the A.C. coupling is to remove any D.C. components due to offsets in the input signal.

The ECG signal as detected at the electrode may have waveforms with magnitudes in the order of a fraction of a millivolt. But the D.C. component of the signal may be very much greater, even by several orders of magnitude. The output of amplifier 17 may have a range of 10 volts in either direction from ground. Typically, the gain of amplifier 17 may be such that the swing of an ECG waveform at its output is in the order of 5 millivolts. The rest of the range is accounted for by the varying D.C. level. It is not feasible to couple the output of amplifier 17 directly to the input of amplifier 21 because the D.C. offset continuously changes as a result of patient movement, switching of electrodes, etc. If there is no way to subtract the D.C. component of the overall signal before it is applied to the input of amplifier 21, it is apparent that the average value of the output signal at terminal 16 will continuously change. If an oscilloscope is used to display the ECG signal, for example, it will be found that the signal moves up and down on the scope and often moves out of range. While this could be corrected by adjusting the D.C. zero, for continuous monitoring it would be far better to automatically remove the D.C. component at the output of amplifier 17. Furthermore, if the D.C. component is not removed before the input to amplifier 21 and if the D.C. component becomes large enough, amplifier 21 may saturate.

The D.C. component is removed by capacitor 18 and resistor 20. Any D.C. component at the output of amplifier 17 causes a current to flow through the capacitor and the resistor, the capacitor charging to the value of the D.C. level. Consequently, the only signals appearing at the input of amplifier 21 are the ECG waveforms without baseline offset. Furthermore, any time the D.C. level changes, the capacitor merely charges or discharges through resistor 20 so that the average value of the input signal to amplifier 21 is once again zero.

Capacitor 18 has no effect on the high frequency components of the ECG signal—for relatively high frequencies the capacitor is a short circuit. However, the capacitor can attenuate the very low frequencies. The product of the resistance (R) of resistor 20 and the capacitance (C) of capacitor 18 is the time constant of the circuit and determines the frequency at the low end of the overall characteristic at which the gain falls 3 db from the maximum value. (Typically, there is also another RC circuit, in which the positions of the resistor and capacitor are reversed, for limiting the gain at the high frequency end of the characteristic.) If the low frequency cut-off is .05 Hz., a typical value, the product RC must be in the order of 3.5 seconds. (The time constant is equal to the reciprocal of the cut-off frequency multiplied by $1/2\pi$.)

The effect of a large pulse at terminal 15 can be understood with reference to the waveforms of FIG. 2. For illustrative purposes, let it be assumed that the ECG waveform amplitude at the output of amplifier 17 is 5 millivolts, and the gain of amplifier 21 is such that a 5-millivolt input results in a full-scale display. It is well known that the voltage spike which appears at terminal 15 in a typical ECG amplifier may have an amplitude which is greater than the otherwise maximum amplitude of the ECG signal by several orders of magnitude. In such a case, the spike at the output of amplifier 17 may have an amplitude of 10 volts since this is the maximum swing of the voltage at the output of amplifier 17. Typically, the spike might have a duration of 5 milliseconds as shown in the drawing. This is so short a time interval compared to the time constant of the circuit that the charging of capacitor 18 can be approximated by a straight line. The voltage across a capacitor cannot change instantaneously and thus the voltage at the junction of capacitor 18 and resistor 20 jumps to 10 volts as soon as the spike is applied. Using the linear approximation for short time intervals, the capacitor then charges according to the equation $V_c = Et/RC$, where $V_c$ is the voltage across the capacitor, E is the voltage at the output of amplifier 17 (10 volts), and RC is the time constant of the circuit. At the end of the spike, after 5 milliseconds have elapsed, the voltage across the capacitor, $V_c$, equals $10(5 \times 10^{-3})/3.5$ or a little over 14 millivolts. Thus, as shown by the upper dotted line in FIG. 2, at the end of the spike the voltage at the input to amplifier 21 is +10 volts, less 14 millivolts. At the trailing edge of the spike the voltage across capacitor 18 immediately drops by 10 volts, and the input to amplifier 21 is −14 millivolts. It is apparent that if the gain of amplifier 21 is such that a 5-millivolt ECG waveform produces a full-scale display, then the 14-millivolt negative signal produces an off-scale output signal. The output signal remains off-scale until capacitor 18 discharges through resistor 20. But with a time constant of 3.5 seconds, it is apparent that the output signal remains off-scale (as shown by the lower dotted line in FIG. 2) for a considerable time period. Several seconds must elapse before capacitor 18 discharges. During this time the output is off-scale and the monitoring information is lost.

Almost always, the amplifier has an adjutsable gain so that it can be used with different types of displays, the gain being selected such that an ECG waveform produces a near full-scale output for the particular display. It is apparent that if capacitor 18 charges during a spike by an amount greater than the normal ECG amplitude at the output of amplifier 17 and if the display gain is set for optimum ECG display, then the display will be off-scale for several seconds. The problem is aggravated in some cases where a large sudden change in the output of amplifier 17 (input of amplifier 21) may exceed the rated input for amplifier 21. In such a case, the input transistors in amplifier 21 may saturate or break down and operate as diodes; the ordinary high input impedance of amplifier 21 is reduced significantly, a large current flows, and capacitor 18 charges to an even greater extent.

The problem is present even if the spikes do not drive the output of amplifier 17 to its maximum value of 10 volts. Suppose that a patient equipped with a pacemaker is being monitored and each pacemaker pulse drives the output of amplifier 17 to 1 volt, as compared to 5 millivolts for each ECG waveform (QRS pulse). At the end of a 5-millisecond spike of this type, capacitor 18 is charged to 1.4 millivolts (compared to 14 millivolts for a 10-volt spike). The next ECG waveform of 5 millivolts is displayed. However, during the next approximately one second between pacemaker pulses, capacitor 18 discharges only about 25%, or to a voltage of approximately 1 volt. The next pacemaker pulse adds 1.4 volts to the capacitor voltage, for a total of 2.4 volts. The capacitor discharges by 25%, and another 1.4-volt increment is then applied. The voltage across capacitor 18 builds up as soon as the pacemaker starts to function, and soon results in an off-scale display. Eventually, capacitor 18 readjusts the D.C. level so that the display is not off scale. However, every time the pacemaker turns on the display disappears for a few seconds. A similar loss of display occurs whenever the pacemaker turns off.

One solution to this problem is disclosed in the copending application of Barouh V. Berkovits, Ser. No. 793,261, filed on Jan. 23, 1969. FIG. 3 is a block-diagram schematic of a system for attenuating spikes appearing on the left side of capacitor 18. Actually, the circuit of FIG. 3 serves a function even broader than that of just preventing saturation of the amplifier by large spikes. The circuit serves to attenuate all high-frequency noise signals. Typically, the maximum frequency of interest in an ECG signal is approximately 50 Hz. High-frequency noise may arise from any one of a number of sources and it is desirable to attenuate such signals. The output of amplifier 21 is fed back to the input of differentiator 25. The output of the differentiator is extended to the input of threshold detector 19. The derivative of a high-frequency signal is much larger than the derivative of a low-frequency signal of the same amplitude, and the threshold detector is adjusted to distinguish between the two situations. If the threshold detector is operated, switch 24 is closed, in the absence of a high frequency noise signal, the output of amplifier 17 is extended directly through resistor 22 to capacitor 18. However, in the presence of a high-frequency noise signal the junction of resistor 22 and capacitor 18 is connected through capacitor 23 to ground. Resistor 22 and capacitor 23 form an integrating network which attenuates high-frequency signals. This is due to the fact that capacitor 23 offers a low impedance to high-frequency signals which are thus shorted through it to ground.

The circuit of FIG. 3, in addition to attenuating high-frequency noise signals, also suppresses the amplitude of any spike transmitted through amplifier 17; the rising portion of the spike is so steep that the output of differentiator 25 triggers threshold detector 19 to close swich 24, and the spike is shorted through capacitor 23 to ground. However, the use of integrating stage 22, 23 has a disadvantage, at least insofar as spike suppression is concerned. Suppose that a high-frequency signal was present in the ECG input and that capacitor 23 was connected through switch 24 to ground. While the capacitor was in the circuit, it charged to the D.C. level of the junction of resistor 22 and capacitor 18, which D.C. level was in turn a function of the D.C. level of the input signal. Suppose that the high-frequency noise then stopped and that switch 24 opened. The voltage across capacitor 23 remains at the previous level. However, the D.C. level at the junction of resistor 22 and capacitor 18 may change, even by several orders of magnitude, since the D.C. level of the ECG signal is continuously changing. The next time that high-frequency noise causes switch 24 to close, capacitor 23 will be connected across the junction of resistor 22 and capacitor 18, and ground. This will cause an abrupt change in the D.C. level at the junction. The resulting transient in the output signal may result in an off-scale display for several seconds.

Still another problem with the circuit of FIG. 3, insofar as spike suppression is concerned, is the fact that the sensitivity of the control loop is affected by the gain of amplifier 21. The height of the rise of the absorbed spike at the junction of resistor 22 and capacitor 23 is not dependent upon the gain of amplifier 21, and thus the output spike of the amplifier will be dependent upon its gain. In a typical case, the gain can be varied between 8.3 and 166 (a ratio of 1:20).

In accordance with the principles of my invention, the aforesaid problems are overcome by providing a nonlinear feedback circuit in lieu of an element which is simply switched in and out of the forward path. Referring to FIG. 4, capacitor 26 and resistor 27 comprise a differentiator (equivalent to differentiator 25 of FIG. 3) whose output at the junction of the two elements is proportional to the derivative of the output signal of amplifier 21. The differentiator is used for two purposes in the circuit of FIG. 4. First, the differentiated signal is applied to the input of threshold detector 19 so that a high-frequency signal, for example, the input step of a spike, results in a differentiator output sufficient to operate the detector. With the operation of the detector, switch 24 closes just as it does in the circuit of FIG. 3. The switch subtracts the threshold voltage from the differentiated signal at the junction of capacitor 26 and resistor 27, and extends it to voltage-to-current converter 32. The current at the output of the converter is fed to the junction of resistor 22 and capacitor 18.

It should be noted at this point that the integrator including resistor 30 and capacitor 31 (connected in the circuit at all times) serves a function other than the integrator comprising resistor 22 and capacitor 23 included in the circuit of FIG. 3, and will be described below.

Threshold detector 19, switch 24 and voltage-to-current converter 32 have an overall transfer characteristic as shown in FIG. 5. The horizontal axis in FIG. 5 represents the voltage at the junction of capacitor 26 and resistor 27, that is, the derivative of the output signal. The vertical axis represents the current which flows out of converter 32. The threshold detector functions to prevent switch 24 from closing until a threshold voltage $V_T$ of either polarity is exceeded (see FIG. 5). Once switch 24 closes, the output current is proportional to the magnitude of the differentiated output voltage at terminal 16, less the threshold value. It should be noted that voltage-to-current converter 32 is such that current flows into the element for positive input voltages.

The impedance seen looking into the output of a current source or sink, and more specifically the output of voltage-to-current converter 32, is very high. Moreover, the voltage at the input to the converter does not determine the voltage at the output. Thus in the circuit of FIG. 4, the voltage at the junction of resistor 22 and capacitor 18 is not affected by the switching in and out of the feedback loop but is only affected by the signal current flowing from voltage-to-current converter 32. Current flowing from converter (current source) 32 flows through resistors 22 and 30 into the output circuit of amplifier 17 because the input impedance of amplifier 21 is much greater than the output impedance of amplifier 17. (Resistor 20 represents the total impedance to ground of the amplifier since it is much smaller in magnitude than the input impedance of the amplifier.) Assume, for example, that a large spike appears at the output of amplifier 17. Initially, the voltage at terminal 16 jumps in magnitude. But as soon as the threshold of detector 19 is exceeded, switch 24 operates. For a positive spike, the characteristic of FIG. 5 shows that current flows into element 32. Element 32 then passes a current through resistor 22 of opposite sense than the spike signal current, tending to cancel it out. Similarly, in the case of a negative spike the current through resistor 22 is of the opposite polarity to the spike current, once again reducing the spike amplitude at the junction of resistor 22 and capacitor 18.

Figure 7:
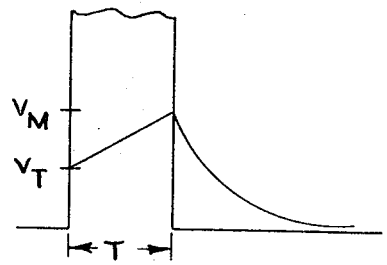
FIGS. 7 and 8 depict various output signals developed by the circuit of FIG. 6 in the presence of large input pulses.

FIG. 7 shows the output waveform as a function of an input spike. The input spike is assumed to be very large and for this reason is not shown to its full height. With the rising portion of the spike, the voltage at the output on terminal 16 jumps immediately to the threshold voltage $V_T$, since before this voltage is reached the feedback loop is not closed. As soon as the voltage at terminal 16 jumps to the value $V_T$, since the voltage across capacitor 26 cannot change instantaneously, threshold detector 19 is triggered. The voltage at the output of amplifier 21 then rises linearly. At the end the spike (assumed to have a duration T), the voltage decays quickly. If $V_M$ is the maximum voltage desired at the output, $V_T$ is preferably made to equal half of this value. The transconductance of the voltage-to-current converter, that is, the slope of the two segments of the characteristic of FIG. 5 where current flows, is such that the output voltage reaches the level $V_M$ at the end of the time period T, the typical duration of a spike in any given application. If the spike has a duration of 5 milliseconds, its effect on the output signal has practically disappeared approximately 10 milliseconds after the input pulse terminates. Actually, at the termination of the input spike, the output voltage falls abruptly to some extent before its exponential decay begins. This is due to the effect of resistor 22 at this time.

Figure 8:
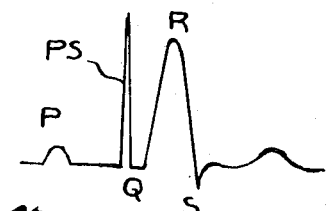

FIG. 8 shows a typical electrocardiographic waveform which might appear at output terminal 16. As mentioned above, a common source of spikes is a pacemaker which might be implanted in the patient. The pacemaker pulse is generated a short time before the QRS wave is exhibited in the ECG waveform. The pacemaker spike appears on output terminal 16 as shown by the letters PS in FIG. 8. The spike PS is the same as the spike shown in FIG. 7, except that the time scale in FIG. 8 is compressed in order that the relative timing of the ECG waveform with respect to the duration of the spike be apparent. The spike in FIG. 8 is not a disadvantage; on the contrary, it is desirable to be able to see the relationship between the pacemaker pulses and the beating of the patient's heart.

Resistor 30 and capacitor 31 simply serve as a delay element. It is desirable that the differentiator in the feedback loop be switched into the circuit before an input spike can overcharge capacitor 18. Resistor 30 and capacitor 31 in effect prevent the full spike from being transmitted instantaneously to capacitor 18. The voltage across capacitor 31 cannot change instantaneously and the voltage at the junction of resistor 30 and capacitor 31 increases exponentially. The time constant of the resistor and capacitor is so small that it has no appreciable effect on the circuit operation, that is, capacitor 31 charges to the full amplitude of the spike in less than a millisecond and at the termination of the spike discharges in the same time interval. The delay is sufficient, however, to allow the feedback loop to be switched into the circuit before capacitor 18 overcharges.

Figure 6:
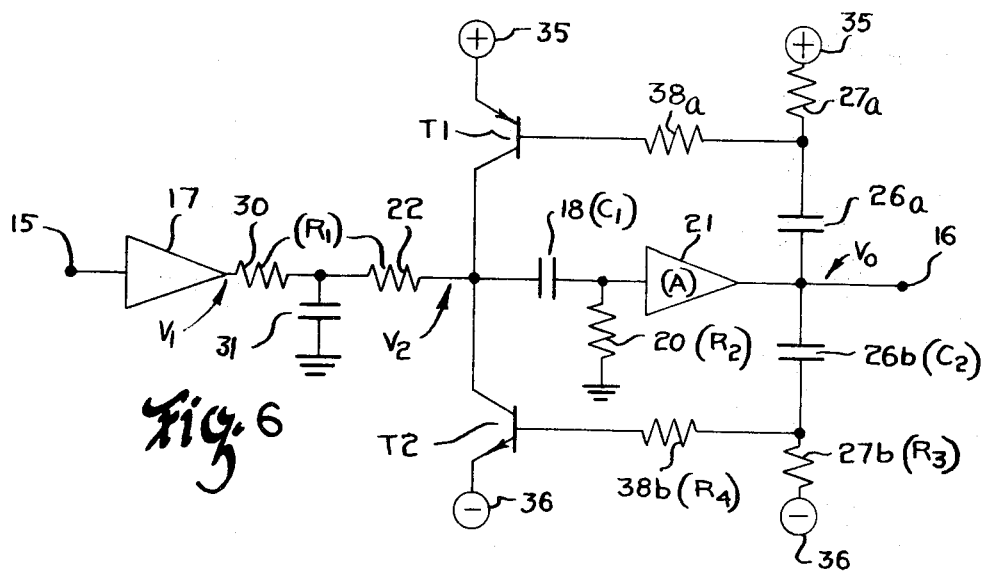
FIG. 6 is detailed schematic of the illustrative embodiment of my invention.

In the actual implementation of the system of FIG. 4, two feedback loops are provided to derive positive and negative values of current since it is simpler to provide two such unipolar loops than a single bipolar loop. Transistor T1 in FIG. 6 has its emitter connected to positive potential source 35 and its base connected through resistor 38a to the junction of capacitor 26a and resistor 27a. Capacitor 26a and resistor 27a are a differentiator whose function is equivalent to that of capacitor 26 and resistor 27 in FIG. 5. The voltage at the output of the differentiator is coupled through resistor 38a to the base of transistor T1 to control the current flowing through the transistor to the junction of resistor 22 and capacitor 18.

Initially, transistor T1 is non-conducting since resistor 27a is returned to source 35 and thus there is no voltage drop across the base-emitter junction of the transistor. In the case of a negative spike, the junction of capacitor 26a and resistor 27a goes negative and the base-emitter junction of transistor T1 is forward biased. The transistor does not conduct, however, until the forward bias is approximately .5 volt. Thus transistor T1 is in effect a threshold detector. It is also a voltage-to-current converter because the current through its collector is directly proportional to the output voltage of the differentiator, less .5 volt. The current into the base of transistor T1 is determined by the voltage drop across resistor 38a. The left side of the resistor is coupled to source 35 through the .5-volt drop across the base-emitter junction of the transistor, and thus the current through resistor 38a equals the differentiator output voltage, less .5 volt, divided by the magnitude of resistor 38a. The collector current from transistor T1 equals the base current multiplied by the current gain of the transistor. For negative spikes, transistor T1 conducts and current flows from the collector toward resistor 22. For positive spikes, the base-emitter junction of transistor T1 remains reverse biased and the transistor does not conduct.

Opposite-polarity transistor T2 operates in a similar manner except that it conducts only in the case of positive spikes. Initially, the base and emitter of the transistor are both at the negative potential of source 36. When the voltage at the junction of capacitor 26b and resistor 27b exceeds .5 volt, transistor T2 conducts and current flows from resistor 22 into the collector of the transistor. Transistor T2 does not conduct in the case of negative spikes.

Resistors 38a and 38b should be used for maximum stabilization of the circuit. Transistors T1 and T2 are current-controlled rather than voltage-controlled and the resistors enable the derivation of a base current proportional to the output voltage for controlling the conduction of either transistor. Furthermore, suppose that resistor 38a, for example, were omitted. Capacitor 26a and resistor 27a would function poorly as a differentiator; in the case of a negative spike resistor 27a would be short-circuited through the base-emitter junction of transistor T1. Actually, the time constant of either differentiator changes value after the associated transistor turns on. Before the threshold is exceeded the effective resistance for the differentiator associated with transistor T1 is simply that of resistor 27a. After the transistor conducts, the effective resistance is determined by the paralleled connection of resistor 27a and resistor 38a. The network elements 26, 27 and 38, and the current gain of transistor T1 or T2 determine the slope of the controlled portion of the waveform.

Two major differences between the prior art circuit of FIG. 3 and the circuit of my invention are the following:

(1) In the circuit of FIG. 3, the energy of the spike is absorbed and stored by capacitor 23 while in my circuit it is returned to the power supply (35 or 36 in FIG. 6) through one of transistors T1 or T2.

(2) In my circuit, the differentiator in the feedback path is isolated from the spike, while the integrator in the forward path of the prior art circuit is coupled directly to the spike.

It will be helpful to analyze the circuit of FIG. 7 for illustrative values. (Only the lower feedback loop will be considered; an identical analysis can be made for the upper feedback loop.) In what follows, the following symbols (see FIG. 6) and component values are used:

$R_1$=sum of the magnitudes of resistors 30 and 22=20K.
$R_2$=magnitude of resistor 20
$C_1$=magnitude of capacitor 18 } $R_2C_1$=3.5 seconds
$R_3$=magnitude of resistor 27b=10K.
$C_2$=magnitude of capacitor 26b=$5 \times 10^{-8}$ f.
$R_4$=magnitude of resistor 38b=10K.
A=voltage gain of amplifier 21, variable between 8.3 and 166
$\beta$=common emitter current gain of transistor T2=200
$V_1$=output voltage of amplifier 17
$V_2$=voltage at collector of transistor T2
$V_0$=output voltage at terminal 16.

In considering the high frequency loop gain, all capacitors can be treated as having zero impedance. Assume that the collector of transistor T2 is disconnected from the junction of resistor 22 and capacitor 18. Since amplifier 21 has an input impedance much greater than $R_1$, $V_1=V_2$, where $V_1$ is the output voltage of amplifier 17 and $V_2$ is the input voltage of amplifier 21 since the effect of capacitor 18 is being neglected. After transistor T2 starts to conduct, the loop gain (ratio of input voltage to amplifier 21 to collector current of transistor T2), neglecting the base-emitter drop of transistor T2, is $A\beta/R_4$ amps/volt. If the collector of transistor T2 is now connected to the junction of resistor 22 and capacitor 18, which is at potential $V_2$, the impedance seen at that junction is $R_4/A\beta=10,000/(200)(8.3)=6$ ohms for the minimum value of A, and $10,000/(200)(166)=.3$ ohm for the maximum value of A.

Suppose it is desired to limit the spike at the output of amplifier 21 to 1 volt. Since transistor T2 starts to conduct with a base-emitter forward bias of .5 volt, it is seen that the output immediately rises to one-half of its maximum value and the loop then closes. Since the impedance seen to the right of resistor 22 is at most 6 ohms, compared to $R_1$=20K., $V_2$ can be regarded as a virtual ground and all of the current flowing through $R_1$ must be derived from the feedback loop since the input impedance of amplifier 21 is so high. For a pulse of magnitude $V_1$ at the output of amplifier 17, $I_1=V_1/R_1$ where $I_1$ is the current through resistors 30 and 22. The base current $I_2$ of transistor T2 has a value $I_1/\beta=V_1/(R_1\beta)$. Since $R_4=R_3$, the current through resistor 27b equals $I_2$, and the sum of the two incremental currents (through capacitor 26b) equals $2V_1/(R_1\beta)$. To a good approximation, the voltage across capacitor 26b rises linearly at the rate of $2V_1/(R_1\beta C_2)$ volts/second. If $V_1$=10 volts (maximum output of amplifier 17), the voltage rate of rise across capacitor 26b is $2(10)/(2 \times 10^4)(200)(5 \times 10^{-8})=100$ volts/second. If the pulse has a duration of 5 milliseconds, the output rises .5 volt from the time the loop is first closed until the pulse terminates. The rise is independent of the gain of amplifier 21.

The analysis above assumed that $V_2$=0 when the loop was closed since $I_1$ was assumed to be $V_1/R_1$ and this is true only if $V_2$=0. However, $V_2$ does rise during the pulse. If the voltage across capacitor 18 is neglected, the final value of $V_2$ necessarily equals the final value of $V_0$ divided by the gain of amplifier 21 since $V_0=V_2A$. For the maximum gain of 166, the final value of $V_2$ is .5/166 or 3 millivolts. For the minimum value of gain, the final value of $V_2$ is .5/8.3 or 60 millivolts.

Capacitor 18 charges linearly since the product $R_2C_1$ is so much greater than 5 milliseconds. For a constant $V_2$ of 3 millivolts, capacitor 18 charges to a voltage equal to (3 millivolts)(5 milliseconds)/(3.5 seconds) or approximately 4.3 microvolts. For a constant $V_2$ of 60 millivolts, capacitor 18 charges to a final value of $20 \times 4.3$ or 86 microvolts.

But capacitor 18 does not charge from a constant $V_2$ (3 millivolts or 60 millivolts in the two cases). Instead, $V_2$ rises by 3 or 60 millivolts during the pulse and thus the average of the changing charging voltage is 1.5 or 30 millivolts in the two cases. Also, $V_2$ initially jumps in voltage with the application of the pulse and this voltage step persists and further causes capacitor 18 to charge. The initial step is simply $V_0/A$ (since the voltage across the capacitor is negligible compared to $V_2$), .5/8.3 (60 millivolts) or .5/166 (3 millivolts) for the two cases. Thus, with a gain of 8.3, the average value of $V_2$ is 30+60 or 90 millivolts; and with a gain of 166, the average value of $V_2$ is 1.5+3 or 4.5 millivolts. Each of these values is 3/2 times the value of $V_2$ used to compute the peak voltage across capacitor 18 in the two cases, and thus the peak voltages must be similarly increased by 50%. The peak voltages across capacitor 18 in the two cases are thus 4.3(1.5) or 6.4 microvolts, and 86(1.5) or 129 microvolts. (Since even the maximum value is considerably less than $V_2$, it is seen that the assumption that capacitor 18 could be omitted in computing $V_2$ is verified.)

The significance of this result is that even with minimum gain (the worst cast), capacitor 18 charges to no more than 129 microvolts, only about 2.6% of the ECG waveform amplitude of 5 millivolts at the output of amplifier 17. Large spikes thus have almost no effect on the base line of the signal at the output of amplifier 21.

It should also be noted that a 5-millisecond spike at terminal 16 rises to a value of 1 volt independent of the gain of amplifier 21 since the value of the gain does not enter into the calculation of $V_0$. The gain only affects the charging of capacitor 18. Thus the operation of the feedback loop is independent of the gain setting.

Although the invention has been described with reference to a particular embodiment, it is to be understood that this embodiment is merely illustrative of the application of the principles of the invention. Numerous modifications may be made therein and other arrangements may be devised without departing from the spirit and scope of the invention.

What is claimed is:

1. An amplifier comprising first and second amplifying stages, capacitive coupling means connected between the output of said first stage and the input of said second stage, means for differentiating the signal at the output of said second stage, means for detecting if the differentiated output signal exceeds a threshold value, voltage-to-current converting means for delivering a current to the output of said first stage which is dependent upon said differentiated output signal, and means for controlling the operation of said voltage-to-current converting means responsive only to the detection by said detecting means that said differentiated output signal exceeds said threshold value.

2. An amplifier in accordance with claim 1 wherein the current delivered by said voltage-to-current converting means is proportional to said differentiated output signal less said threshold value.

3. An amplifier in accordance with claim 1 wherein said voltage-to-current converting means functions as a positive current sink for positive input voltages and as a negative current sink for negative input voltages.

4. An amplifier in accordance with claim 1 further including delay means connected between the output of said first stage and said capacitive coupling means.

5. A spike suppression circuit for an amplifier having capacitive coupling means therein comprising means for detecting a spike at the output of said amplifier having a magnitude greater than a predetermined threshold, differentiating circuit means connected to the output of said amplifier for deriving a differentiated output signal, and means for applying a current ahead of said capacitive coupling means in the forward path of said amplifier which is a function of said differentiated output signal responsive to the operation of said threshold detecting means.

6. An amplifying circuit for connection between an input terminal and an output terminal comprising a voltage amplifier, a first resistor connected at one end thereof to said input terminal, a capacitor connected between the other end of said first resistor and the input of said voltage amplifier, the output of said voltage amplifier being connected to said output terminal, a second resistor connected between the input of said voltage amplifier and ground, a pair of opposite-polarity transistors each having a collector terminal connected to the junction of said first resistor and said capacitor and an emitter terminal connected to a potential source of a respective polarity, resistance means connected in series with the base terminal of each of said transistors, and means for coupling each of said resistance means to said output terminal through a differentiating network.

7. An amplifying circuit for connection between an input terminal and an output terminal in accordance with claim 6 further including a delay network connected between said input terminal and said first resistor.

References Cited

UNITED STATES PATENTS 2,783,377   2/1957   Wafford _____ 328—165

ROY LAKE, Primary Examiner

J. B. MULLINS, Assistant Examiner

U.S. Cl. X.R.

128—2.06; 328—165; 330—110